Dec. 22, 1953  J. R. SNYDER  2,663,315
SELF-ALIGNING QUICK DISCONNECT COUPLING
Filed July 26, 1949  3 Sheets-Sheet 1
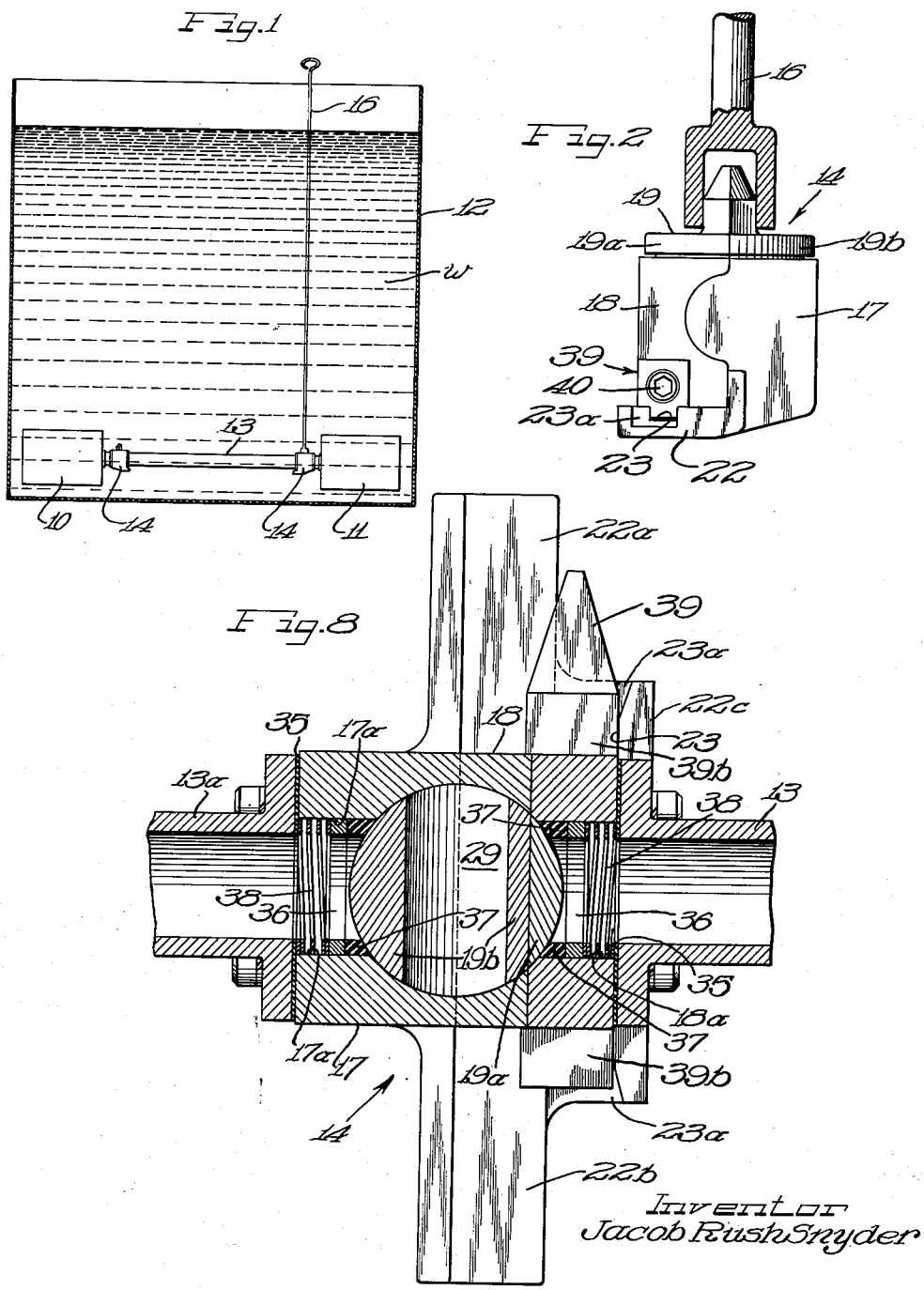

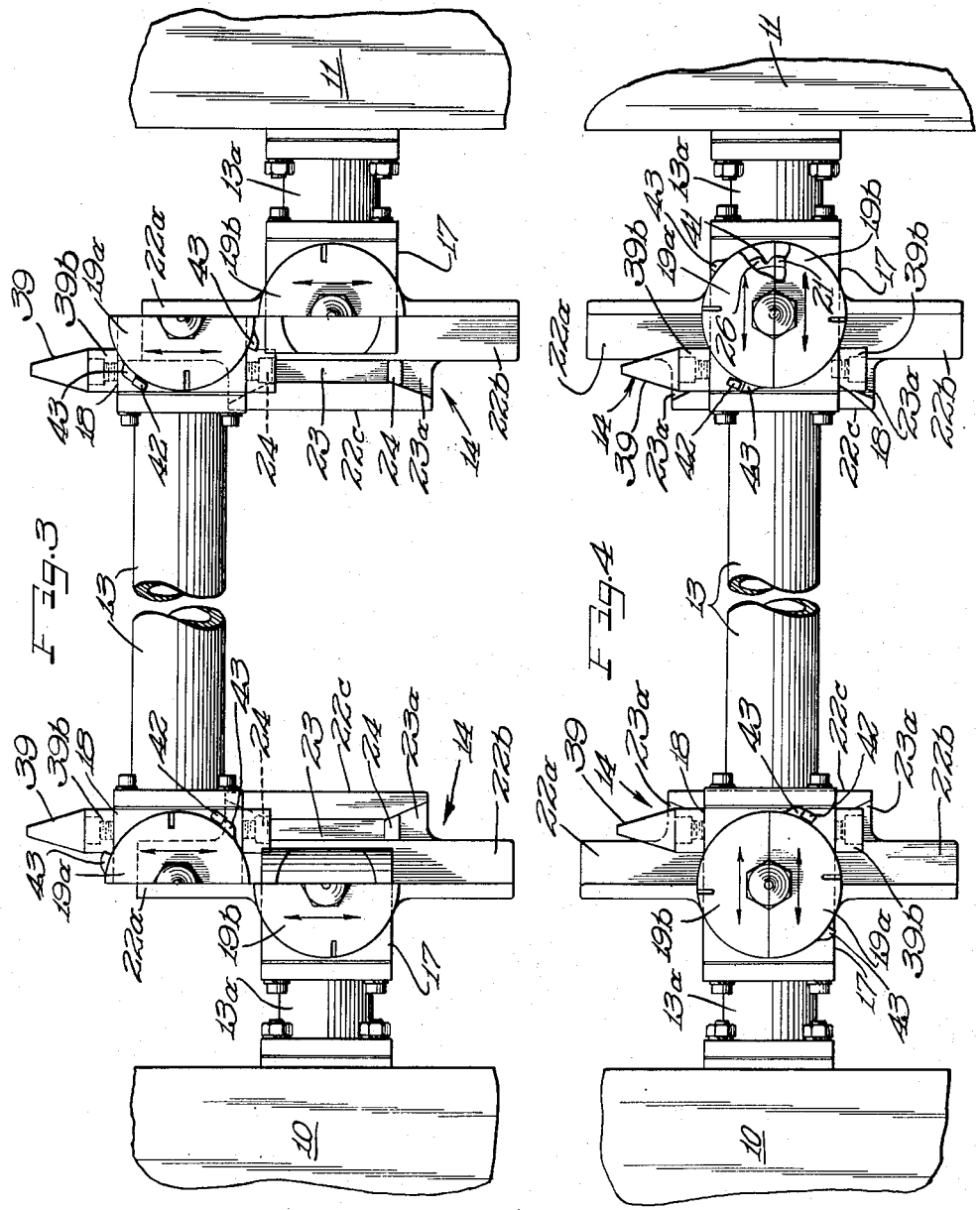

Dec. 22, 1953  J. R. SNYDER  2,663,315
SELF-ALIGNING QUICK DISCONNECT COUPLING
Filed July 26, 1949  3 Sheets-Sheet 3
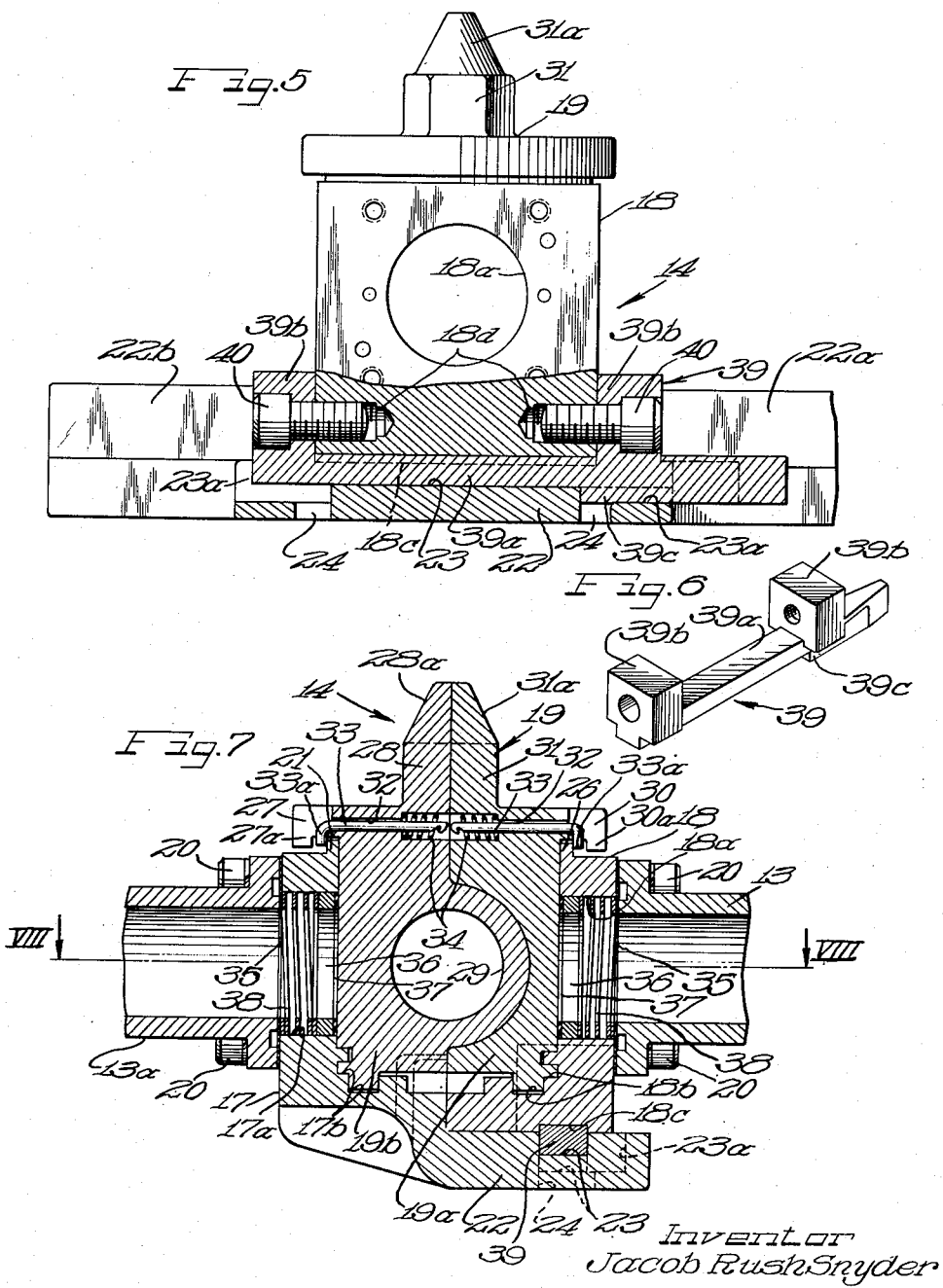
Inventor
Jacob Rush Snyder
By The Firm of Charles W. Hills Attys Patented Dec. 22, 1953

2,663,315

UNITED STATES PATENT OFFICE 2,663,315

SELF-ALIGNING QUICK DISCONNECT COUPLING

Jacob Rush Snyder, Cleveland, Ohio, assignor to Thompson Products, Inc., Cleveland, Ohio, a corporation of Ohio Application July 26, 1949, Serial No. 106,929

6 Claims. (Cl. 137—614)

This invention relates to an improved coupling of the type having a split rotatable plug detachably connecting a pair of coupling boxes for controlling fluid flow therebetween and more particularly relates to an aligning structure for a quick disconnect coupling which will facilitate alignment of the coupling parts for operation from a remote point.

Specifically, the present invention contemplates the provision of a modified quick disconnect coupling having novel and improved means for connecting and disconnecting two coupling units when attached to a tubular passage connecting multiple tanks which are located in such a manner as to preclude ready accessibility, as for example, when such tanks are submerged in a considerable depth of water.

According to this invention, complementary coupling parts are arranged for connection with the ends of a conduit adapted to establish a fluid passage between multiple tanks under water of a considerable depth. A split rotatable cylindrical valve or plug detachably connects the coupling parts and controls fluid flow between the parts. A portion of the valve is retained in each coupling part for sealing the respective ports when the same are uncoupled so as to prevent loss of fluid out of the separated conduit or out of the isolated tanks.

Because certain tanks used in handling fluids must of necessity be deeply submerged in water as much as 25 feet or more and maintenance and examination procedures require that the fluid lines under the water be connected and disconnected from time to time, the present invention contemplates the provision of a self-aligning coupling having a purposely developed offset elevation forming a key and keyway structure on the coupling elements. An offset shelf portion is provided on one element which defines a keyway with tapered finding ends and a locating shoulder therein. A key is provided for the other coupling element and has a protruding locating shoulder thereon so that the coupling elements may be slidingly assembled with comparative ease and the key will be positively positioned in its shelf keyway to align the coupling elements for cylinder rotation.

The structure may be further provided with stops for flow positioning the valve or plugs and spring locking means which not only retain the coupling assembly in flow position but also prevent the split valve or plug parts from changing their sealing position while the coupling portions are being connected or disconnected.

An object of the present invention therefore is to provide a self-aligning quick disconnect coupling.

A further object of the invention is to provide a key and keyway structure for a quick disconnect coupling whereby alignment of coupling parts may be facilitated from a remote point.

Another object of the present invention is to provide a multiple tank assembly whereby a plurality of tanks may be placed in fluid communication with one another from a remote point as, for example, when the tank assembly is completely submerged in a considerable depth of liquid.

Yet another object of the invention is to provide a self-sealing coupling which may be quickly aligned to facilitate the coupling operation.

Many other features, advantages and additional objects of the present invention will become manifest to those versed in the art upon making reference to the detail description which follows and the annexed sheets of drawings which, by way of preferred example, illustrate a preferred embodiment of the invention.

On the drawings:

Figure 1 is a somewhat diagrammatic elevational view with parts in section showing a multiple submerged tank assembly in accordance with the invention;

Figure 2 is an elevational view of a quick connect coupling according to the present invention, showing a rotating tool, partly in section, cooperatively associated with the split valve or plug of the coupling;

Figure 3 is an enlarged fragmentary view of the multiple tank assembly shown in Figure 1 with some of the quick disconnect coupling components disposed in a locating position;

Figure 4 is a view similar to Figure 2 but showing the quick disconnect coupling components disposed in a flow position;

Figure 5 is an enlarged and elevational view with parts broken away and with parts in section showing additional details of construction of a quick disconnect coupling according to the present invention;

Figure 6 is a perspective view of a reversible key employed in the present invention;

Figure 7 is a cross-sectional view of a quick disconnect coupling according to the invention; and Figure 8 is a cross-sectional view taken on line VIII—VIII of Figure 7.

As shown on the drawings:

Although it will be understood that the quick disconnect coupling disclosed in the present invention can be successfully employed wherever it is necessary to facilitate the alignment of coupling parts from a remote point, the invention will be explained in connection with its application to a submerged tank installation since such an application presents an environmental condition wherein alignment for a coupling operation is especially difficult.

Referring generally to Figure 1, a tank 10 and a tank 11 arranged in predetermined spaced relationship are shown submerged beneath the surface of a considerable depth of water W held in a container 12.

A conduit 13 is arranged between the tanks 10 and 11 to establish a fluid passageway therebetween. A pair of quick disconnect couplings 14 constructed in accordance with the present invention are associated with the conduit 13 to accomplish selective connection and disconnection of the submerged fluid line. As shown in Figure 1, a lengthy rotating tool 16 may be provided so that the couplings 14 may be operated from an accessible locale above the surface of the body of water W.

Referring now to Figures 2, 5, 7 and 8, the reference numeral 14 designates generally a coupling according to this invention composed of a male coupling box 17, a female coupling box 18, and a split rotatable valve or plug 19 carried by the coupling boxes and composed of half sections 19a and 19b.

The male coupling box 17 has a flat end face with internally threaded holes extending inwardly for receiving fasteners which may be passed through a perforated flanged end portion of a short length of conduit extension 13a fixed in fluid communication with one of the tank units 10 or 11. An upstanding semi-circular flange 21 is provided on the top of the coupling box 17 in inwardly spaced relation from the end face thereof. The male coupling box 17 is further provided with a port 17a to pass fluid therethrough.

The bottom wall portion of the male coupling 17 is characterized by the provision of semi-circular stepped grooves 17b (Figure 7) on the inner face thereof and is further provided with an offset shelf portion 22 formed as an integral part of the coupling section but extending downwardly and laterally away therefrom (Figure 2).

The offset shelf portion 22 defines extending arms 22a and 22b (Figures 5 and 8) and a relatively centrally located reduced dimension portion identified by the reference character 22c. The reduced dimension portion 22c of the offset shelf portion 22 is provided with a key slot or keyway 23 having tapered finding ends 23a (Figure 3). Suitable perforated windows 24 are provided in the bottom of the keyway or key slot 23 so as to provide an escape passage for dirt and other foreign particles which might impair efficient operation of the coupling structure.

The keyway 23 is preferably arranged to lie on tiered level so that the level of the tapered finding end portions 23a is relatively lower than that portion of the keyway lying between the spaced perforated windows 24. In this manner, the centrally disposed portion of the keyway 23 forms a key stop for positioning and aligning the key element which will be described hereinafter.

The female coupling box 18 has a flat end face similar to the end face on the male coupling box 17 and is also provided with a plurality of inwardly extending threaded holes for receiving fasteners 20 adapted to pass through the flange end portion of a conduit similar to the conduit 13. The female coupling box 18 is further provided with an upstanding semi-circular flange 26 on its top portion and defines a port 18a for passing fluid therethrough.

The bottom wall of the female coupling box 18 is characterized by the provision of stepped semi-circular grooves 18b (Figure 7) and is further provided with a flat bottom face on its outer side which is broken by a recessed slot 18c which is adapted to seat a key member as will hereinafter be more fully described.

The coupling boxes 17 and 18 are constructed in such a manner as to define an open top cylindrical chamber when placed together in abutting relation so as to receive the rotatable valve or plug 19 in cooperative association therewith.

The male section 19b of the plug or valve 19 has a semi-cylindrical wall which terminates in its top portion in a radially extending flange 27 having a depending lip portion 27a. A protuberance or lug in the form of a half section of a hexagonal nut is provided on the top of the male section 19b and is identified by the reference character 28. The protuberance or lug 28 is characterized by a tapered section 28a which resembles a half section of a cone.

The bottom portion of the male section 19b of the valve or plug 19 is provided with stepped bead portions which are adapted to cooperate with the semicircular stepped grooves 17b (Figure 7).

The male section 19b of the valve or plug 19 is further characterized by a laterally offset portion which is of substantially semi-cylindrical configuration and through which extends a bore 29.

The female section 19a of the valve or plug 19 is also provided with a semi-cylindrical wall terminating in its upper portion in a radially extending flange 30 having a lip 30a. An upwardly extending protuberance or lug 31 taking the form of a half section of a hexagonal nut and also having a tapered section 31a in the form of a half section of a cone is provided in the same manner as previously described in connection with the male section 19b.

The bottom portion of the female section 19a of the plug or valve 19 defines a series of stepped beads which are adapted to cooperate with the grooves 18b formed in the female coupling box 18.

One side of the female section 19a of the valve or plug 19 is recessed laterally inward whereby the female section 19a is adapted to lie in cooperative abutting relationship with the semi-cylindrical offset portion formed on the male section 19b.

Both of the sections of the valve or plug 19 are provided with suitable counterbored apertures 32 through which extend a pair of pins 33 having keys 33a on the ends thereof which are adapted to overlie and ride on the outer faces of the upstanding flanges 21 and 26 formed on the coupling boxes 17 and 18, respectively. Each of the pins 33 is resiliently biased by a spring 34 fastened to the ends of the pins and shouldered in the counterbored portion of the apertures 32.

A seal assembly is located in each of the ports 17a and 18a of the male and female coupling boxes 17 and 18, respectively. As may best be seen in Figures 7 and 8, the seal assembly includes a collar 36 which shoulders up against a ring of sealing material 37 having a recessed cylindrical engagement surface on one side. Each collar 36 is placed under a resilient bias by a spring 38 which shoulders up against the collar 36 and abuts a gasket 35 positioned between the end faces of the coupling boxes and the flange end portions of the conduit arranged adjacent thereto. In this manner, the rings of sealing material 37 snugly engage the cylindrical walls of the male and female sections 19b and 19a of the valve or plug 19.

According to this invention, a reversible key 39 is provided (Figure 6) which has a body portion 39a adapted to slide in the keyway 23. A pair of spaced upstanding lugs 39b suitably perforated by counterbored apertures are provided for the key 39 so that the key 39 may be firmly affixed to the female coupling box 18 by means of suitable fasteners 40 which are threadedly receivable in a pair of inwardly extending internally threaded bores 18d formed in the female coupling box 18 (Figure 5).

The bottom portion of the key 39 is provided with a depending shoulder 39c extending longitudinally thereof which is adapted to function as a locating shoulder so that movement of the key 39 relative to the keyway 23 will be limited when the shoulder 39c abuttingly engages the locating shoulder defined by the upstanding central portion located between the window apertures 24 in the keyway 23.

It will be apparent that the construction of the key 39 is such as to make it especially adaptable for reversible use. Thus, the key may be employed on either a right hand or left hand coupling box with equal efficiency.

In operation, reversible keys 39 are quickly assembled to the female coupling boxes 18, which are, in turn, affixed to the ends of a conduit 13 of appropriate length for establishing a fluid passage between a multiple tank assembly as shown in Figure 1.

Complementary male coupling boxes 17 are affixed on the ends of the conduit extensions 13a affixed to the sides of the multiple tank units 10 and 11 and are thereby spaced from one another according to a predetermined relationship.

Prior to complete assembly, the male section 19b of the valve or plug 19 is carried by the male coupling box 17 and the female section 19a of the valve or plug 19 is carried by the female coupling box 18.

It will be understood that the male and female sections of the valve or plug 19 will, prior to complete assembly, be in a closed position as shown in Figures 7 and 8 so that the ports 17a and 18a will be effectively sealed in each of the respective coupling boxes.

It will also be apparent that the arms 22a and 22b of the shelf portion 22 formed on each male connector 17 will be substantially disposed in aligned position when employed in the quick disconnect coupling adapted for use on a multiple tank assembly similar to the embodiment herein described by way of illustrative example. Thus, as an entire coupling comprising the conduit 13 having the female connectors 18 affixed to the ends thereof is moved toward a connecting position, the various elements will approach a locating position shown in Figure 3.

As the entire coupling is shifted, the key 39 on each respective female coupling box 18 may be easily directed toward the general direction of the tapered finding ends 23a of the keyways or key slots 23. Further lateral movement of the entire coupling will result in the engagement of the keys 39 in the restricted portions of the keyways or key slots 23 and the inner bottom face of each respective female coupling box 18 will tend to become aligned with the face presented by the corresponding offset shelf portion 22.

It will be noted that the keys 39 will permit positioning of the entire coupling relative to the male coupling boxes 17 without interference until the shoulder 39c positively aligns each female coupling box 18 relative to its complementary mating male coupling box 17 through abutting contact engagement with the raised portion of the keyway or key slot 23.

It will also be noted that the protruding portions or lugs 28 and 31 on the sectionalized valve or plug 19, when brought together, develop into a hexagonal shape nut suitable for applying a turning tool such as a socket wrench or the lengthy tool 16 illustrated in the drawings. The tapered ends 28a and 31a of the protrusions 28 and 31 facilitate the positioning of the turning tool 16 relative to the hexagonally shaped integral boss or lug.

When the female coupling boxes 18 of the entire coupling assembly are positioned in the keyways or key slots 23 of the offset shelf portions 22, the bottoms of the female coupling boxes 18 will be firmly held together so that when the turning tool 16 is positioned on the hexagonal shaped lug, the top portions of each female coupling box 18 will be forced into its respective turning position relative to a corresponding male coupling box 17 so that the sectionalized valve or plug 19 may be turned from its disconnect position (Figure 3) to a flow, or connect position (Figure 4).

When the sectionalized valve or plug 19 is rotated, the bead portions on the lower part of the valve or plug 19 will ride in the semi-circular grooves 17b and 18b in such a manner that a portion of the male section 19b of the valve or plug 19 will be received by the female coupling box 18 and likewise, a portion of the female section 19a of the valve or plug 19 will be received by the male coupling box 17. Rotative movement through a one-quarter revolution of the valve or plug 19 will place the bore 29 in axial alignment with the ports 17a and 18a thereby joining the coupling boxes in fluid flow relationship.

It will be apparent that a particular feature of the key and keyway structure herein provided resides in the fact that the danger of jamming the valve or plug 19 in the mating grooves 17b and 18b is substantially precluded because the respective coupling boxes will be firmly supported when in operating position. This feature is especially desirable inasmuch as the danger of damaging the coupling components through the application of misdirected torque forces is greatly reduced.

In order to retain the assembled parts in flow position and in order that the male and female sections of the valve or plug 19 may be retained in their set positions while the coupling portions are being connected or disconnected, the upstanding flanges 21 and 26 of the male or female coupling boxes 17 and 18, respectively, may be provided with a plurality of spaced indentations, one of which, by way of example, is shown at 41 on the broken section of the right hand coupling 14 of Figure 4. It will be understood that one of the spring biased pins 33 with the vertical keys 33a riding on the outer face of the upstanding flanges 21 and 26 will fall into an appropriate indentation 41 whenever the valve or plug sections 19a and 19b are rotated through a quarter turn.

The female coupling boxes 18 may also be provided with appropriate stops 42 (Figures 3 and 4) which cooperate with suitable lugs 43 defined by the female section 19a of the valve or plug 19 so as to position the valve elements in either flow position or disconnect position.

It will be apparent that I have described a coupling assembly which provides an economical and efficient means for connecting and disconnecting fluid conduits which are so situated as to necessitate manipulation from a remote locale.

It will also be apparent that I have described an improved quick disconnect coupling which is uniquely suited to accomplish self-alignment and which may be effectively used to place passageways of complementary coupling boxes in full fluid flow communication.

It will be understood, of course, that a person skilled in the art might suggest various minor modifications to the preferred embodiment herein described by way of illustrative example only, however, I do not propose to be limited to the precise details set out for the sake of clarity but wish to embrace within the scope of this patent all such modifications as reasonably and properly fall within the scope of my contribution to the art.

I claim as my invention:

1. A multiple fluid flow conduit assembly comprising, in combination, at least two conduit units arranged in spaced relationship and a self-aligning coupling assembly therefor, including a conduit for establishing a fluid passage between said conduit units, female parts on each end of the conduit, male parts on each of the conduit units, said male and female parts comprising complementary elements with ports therein for fluid flow therethrough, each of said male parts being provided with an offset shelf portion defining a key slot with tapered finding ends and a keyway shoulder therein, each of said female parts carrying a key defining a locating shoulder to cooperatively abut the shoulder in said key slot, a multi-piece valve rotatably mounted in each cooperating pair of said male and female parts to detachably connect the same, and means retaining a portion of said valve in each part for sealing the ports when the parts are disconnected, whereby said coupling assembly may be positively aligned by the coaction of said keys and said key slots for selectively placing said conduit units in fluid communication with one another upon rotation of said valves.

2. A coupling comprising a pair of complementary parts having ports therein for fluid flow therethrough, a multi-piece valve rotatably mounted in both of said parts to detachably connect the same, means retaining a piece of said valve in each part for sealing the ports when the parts are disconnected, and a latch assembly associated with said parts for aligning same in connect and disconnect position including an offset shelf portion of one of said parts defining a key slot having tapered finding ends and a locating shoulder therein and a key carried by the other part and defining a protruding locating shoulder, said key being slidably receivable in said key slot and both of said locating shoulders being engageable in abutting relationship to accurately position the complementary parts for selective coupling connection.

3. A coupling comprising a pair of complementary coupling boxes having passageways therethrough and together defining an open top chamber intersecting said passageways, a split plug valve rotatably mounted in said chamber, an offset shelf on one of said coupling boxes defining a keyway, and a key on the other of said coupling boxes receivable in said keyway, said key having a protruding shoulder, said key being slidably cooperable with said keyway to guide the boxes toward an operating position, and a locating shoulder in said keyway engaging said shoulder of said key only when said boxes are in predetermined alignment to accurately position the boxes for valve rotation.

4. A coupling comprising a pair of complementary coupling boxes having passageways therethrough and together defining an open top chamber intersecting said passageways, a split plug valve rotatably mounted in said chamber and having a grooved flange overlying the mouth of the chamber, upstanding flanges on the coupling boxes to seat in the groove of the overlying flange, indentations in said upstanding flanges, spring biased pins extending through the plug parts having keys on the ends thereof adapted to ride on the outer face of the upstanding flange for selective seating in said indentations whereby rotation of the plug parts will be limited, an offset shelf on one of said coupling boxes defining a keyway having a shoulder, and a key on the other of said coupling boxes receivable in said keyway, said key defining a protruding locating shoulder, said key and keyway slidingly aligning the boxes toward an operating position determined by the abutment of the locating shoulder with the shoulder in said keyway, said spring biased pins operative to selectively retain the plug parts in a pre-set position when said boxes are being aligned and when said plug parts are in an assembled flow position.

5. In a self-sealing coupling of the type having complementary ported housing sections with a multi-piece valve rotatably mounted therein for selectively connecting said sections, the improvement of a shelf offset from one of said housing sections and having a keyway formed therein, and a key carried by the other of said housing sections arranged to be cooperatively received by said keyway for aligning the sections in coupling position, said key having a locating shoulder, and said keyway having a depressed portion providing a locating stop engageable with said shoulder to limit the relative movement of said key in said keyway, said shoulder and said locating stop arranged to engage at a predetermined stop position, and mating lugs projecting from the sections of said multi-piece valve and together forming a wedge shaped turning head with a converging leading end for directing a turning tool into position thereon, whereupon application of the turning tool over the turning head will completely mate the housing sections for the coupling operation.

6. A coupling comprising a pair of complementary coupling boxes having passageways therethrough and together defining an open top chamber intersecting said passageways, a split plug valve rotatably mounted in said chamber, an offset shelf on one of said coupling boxes defining a keyway, a key on the other of said coupling boxes receivable in said keyway to slidingly guide the boxes toward an operating position, and a shaped protruding mating lug on each of the sections of the split plug valve extending outside of the coupling boxes and together with one another forming a wedge shaped tool receiving nut, whereby a turning tool may be positioned over said lugs to force the coupling boxes into turning position and to actuate said split plug valve.

JACOB RUSH SNYDER.

References Cited in the file of this patent

UNITED STATES PATENTS

| Number | Name | Date |
| --- | --- | --- |
| 534,609 | Lunt | Feb. 19, 1895 |
| 656,956 | Eibee | Aug. 28, 1900 |
| 1,102,206 | Witmer | June 30, 1914 |
| 1,103,403 | Ducksworth | July 14, 1914 |
| 1,214,425 | Caston | Jan. 30, 1917 |
| 1,289,798 | Jolliff | Dec. 31, 1918 |
| 2,297,966 | Luff | Oct. 6, 1942 |
| 2,326,143 | Hufferd | Aug. 10, 1943 |
| 2,357,232 | Snyder et al. | Aug. 29, 1944 |
| 2,399,515 | Snyder | Apr. 30, 1946 |
| 2,500,847 | McKay | Mar. 14, 1950 |